United States Patent [19]

Perkins et al.

[11] Patent Number: 5,745,897

[45] Date of Patent: Apr. 28, 1998

[54] METHOD AND SYSTEM FOR COMPILING MANAGEMENT INFORMATION BASE SPECIFICATIONS

[75] Inventors: David Theodore Perkins; Gregory Allen Foster, both of Santa Clara, Calif.

[73] Assignee: Bay Networks Group, Inc., Santa Clara, Calif.

[21] Appl. No.: 342,856

[22] Filed: Nov. 21, 1994

[51] Int. Cl.$^6$ .................................................. G06F 17/30
[52] U.S. Cl. ............................ 707/101; 395/500; 707/1; 707/100; 707/200
[58] Field of Search ............................ 395/600, 650, 395/500, 700, 612, 601, 611, 616, 200.54; 364/200

[56] References Cited

U.S. PATENT DOCUMENTS

| | | | |
|---|---|---|---|
| 5,291,583 | 3/1994 | Bapat | 395/500 |
| 5,428,786 | 6/1995 | Sites | 395/700 |
| 5,491,796 | 2/1996 | Wanderer et al. | 395/200.09 |

*Primary Examiner*—Thomas G. Black
*Assistant Examiner*—Cheryl R. Lewis
*Attorney, Agent, or Firm*—Blakely, Sokoloff, Taylor & Zafman LLP

[57] ABSTRACT

A system and method for generating a plurality of output files based on a Management Information Base (MIB) specification is provided. The system includes one or more MIB compilers designed to produce outputs based on a MIB specification. Each of the MIB compilers reads a set of directives that are maintained separate from the MIB specification. The set of directives indicate which of the modules and items defined in the MIB specification are to be processed during a given MIB compilation operation. The set of directives may also specify MIB additional attributes and values for items that are defined in the MIB specification. The set of directives may also specify that, for the purposes of the MIB compilation operation, a MIB item is to be treated as though it had a different attribute than an attribute specified for the MIB item in the MIB specification. The system also includes a single syntax checking unit that checks for syntax errors in the MIB specification prior to sending data representing the MIB specification to any MIB compiler in the system. The system includes a MIB compiler for generating, from multiple files containing a one or more MIB module specifications, a single file containing a single MIB module specification. The system also includes a MIB compiler for generating a directive file containing single-item selection directives from a directive file containing one or more multiple-item selection directives.

20 Claims, 3 Drawing Sheets

METHOD AND SYSTEM FOR COMPILING MANAGEMENT INFORMATION BASE SPECIFICATIONS

FIELD OF THE INVENTION

The present invention relates to network management applications, and more specifically, to a method and system for compiling Management Information Base (MIB) specifications.

BACKGROUND OF THE INVENTION

A network generally includes a number of devices connected to allow inter-device communication. As the size of a network increases, it becomes increasingly important to effectively and efficiently manage the network. To monitor and manage a network, applications running on workstations communicate with the agents running on the various devices within the network. The communications between the applications and the agents must be performed according to a protocol, such as the Simple Network Management Protocol (SNMP). SNMP is currently used and supported by most Open System based network devices.

The type of information that an agent is able to provide about the device on which the agent is running depends on the Management Information Bases (MIBs) that the agent supports. MIB specifications are typically stored in text files. A typical MIB specification consists of a list of module definitions. Within each module definition, the following types of items can be defined: sequences of managed objects, semantic tagging of syntax types, registration points in an object identifier tree, tables, rows in tables, managed objects, and traps.

The items in one MIB module can optionally use some items from previously defined MIB modules. Under these circumstances, the one MIB module has linkage specifications ("IMPORTS") that identify the items and the name of the previously defined MIB module. Various aspects of SNMP and MIBs are described in Request For Comment (RFC) document numbers RFC 1155, RFC 1157, RFC 1212, RFC 1215 and RFC 1213. These RFC documents are publicly available. Information about how receive copies of these documents may be obtained by sending an electronic mail message with the first line "help: ways_to_get_rfcs" to rfc-server@isi.edu.

The SNMP protocol is used to retrieve and modify only leaf objects via a request-response interaction and asynchronous reporting of events with associated leaf object values. An agent supports a MIB if the agent is capable of responding to retrieval (e.g. "GET" and "GETNEXT") or modification (e.g. "SET") requests to one or more leaf objects defined in the MIB, or generating traps defined in the MIB. An agent that is capable of responding to all defined leaf objects and generating all traps has complete support for the MIB. Agents that respond to a subset of the objects, respond to a subset of the operations, allow only a limited subset of values to be used to modify an object, or change the objects returned in a trap provide deviate support.

It has been discovered that certain product development functions that are related to network management can be automated through the use of tools that generate output based on the information contained in MIB specifications. Tools that generate output based on MIB specifications are generally referred to as MIB compilers. MIB compilers may include, for example, a tool for generating documentation describing management capability, a tool for generating data structures and dispatch tables for SNMP agents, and a tool for generating code that defines data structures for applications.

Each work group involved in an aspect of a network management (e.g. development of agent applications, testing, support, and documentation) may have its own set of MIB compilers. For example, the application development group may have a first set of MIB compilers for automatically generating portions of application code. The agent development group may have a second set of MIB compilers for automatically generating portions of agent code. The testing group may have a third set of MIB compilers for automatically generating code for tools to test applications or agents. Further, the documentation group may have a fourth set of MIB compilers to automatically generate portions of documentation. Consequently, the same MIB specification may contain information required by numerous MIB compilers.

Unfortunately, not all MIB compilation operations require the same information from a MIB file. Typically, only certain portions of a MIB will be relevant for a particular MIB compilation operation. Further, many MIB compilation operations require additional information that is not supplied in standard MIB specifications.

Prior to most MIB compilation operations, a user must modify the standard MIB files to (1) remove information that is not required in the MIB compilation operation and (2) add information that is required by the MIB compilation operations but that is not provided in the standard MIB specification. Once the standard MIB file has been revised as required by the particular MIB compilation operation, the MIB compiler reads the revised MIB file and generates output based on the revised MIB file.

Consider, for example, a MIB compiler that reads MIB files and generates source code corresponding to the MIB objects defined in the MIB files. Assume that one standard MIB specification defines Modules A, B and C, and that another standard MIB specification defines Modules D and E. One may wish to use the MIB compiler to generate source code for two agents, an Agent 1 and an Agent 2. Agent 1 will support Modules A, B, and D. Agent 2 will support Modules B, C and E.

Prior to performing the MIB compilation operation for Agent 1, a user must create a revised MIB specification by deleting Module C from the standard MIB specification and adding Module D to the standard MIB specification. Similarly, prior to performing the MIB compilation operation for Agent 2, the user must create a second revised MIB specification by deleting Module A from the standard MIB specification and adding Module E to the standard MIB specification.

As explained above, some agents may support some but not all of the MIB modules in a particular MIB specification. Similarly, some agents may support some but not all of the objects defined in a particular MIB module. For example, a MIB module may define objects 01, 02, 03 and 04. Agent 1 may implement objects 01 and 04, while Agent 2 implements object 02 (and neither implement object 03). Prior to performing a MIB compilation operation for Agent 1, objects 02 and 03 would have to be removed from the MIB module. Prior to performing a MIB compilation operation for Agent 2, objects 01, 03 and 04 would have to be removed from the MIB module.

As mentioned above, different MIB compilation operations will typically have different input requirements. Therefore, the standard MIB must be revised in different ways to conform to each MIB compilation operation. FIG. 1 is a data flow diagram illustrating a MIB compiler 108 configured to perform two MIB compilation operations based on the same standard MIB file 102.

To prepare MIB 102 for the first compilation operation, a user must first revise the standard MIB file 102. The revisions may include deleting unused portions of the MIB, and adding information not provided in the standard MIB. These changes may be made to the standard MIB file 102 using a text editor, for example. Block 104 represents the operation of revising the standard MIB file 102 so that it conforms to the specific input requirements of the first compilation operation.

As the result of the revisions, a compilation-specific MIB file 106 is created. MIB compiler 108 reads the compilation-specific MIB file 106 to generate some output 110 based on the compilation-specific MIB file 106. The particular output generated will vary based on the nature of MIB compiler 108.

Prior to a second compilation operation, the standard MIB file 102 must be revised again. Compilation-specific MIB file 106 cannot be used because the revisions required for the second compilation operation are different than those required for the first compilation operation. Consequently, the user must go back to the standard MIB file 102 and apply different revisions. The revision operation required to place the standard MIB file 102 in conformance with the input requirements of the second compilation operation is represented by block 112.

As the result of the revisions, a second compilation-specific MIB file 114 is created. MIB compiler 108 reads the compilation-specific MIB file 114 to generate some output 120 based on the compilation-specific MIB file 114. As mentioned above, the nature of the output 120 of MIB compiler 108 depends on the nature of MIB compiler 108.

During the creation of outputs 110 and 120, two new versions of the standard MIB file 102 were produced. Typically, a different version of the standard MIB file 102 must be produced for each agent. This proliferation of non-identical versions of the same MIB file may be difficult to manage. The inefficiency of the MIB compiler system shown in FIG. 1 is further compounded if changes are made to the standard MIB file 102, as shall now be explained with reference to FIG. 2.

Referring to FIG. 2, it illustrates the steps that must be performed when the standard MIB file 102 has been updated to produce an updated standard MIB file 202. For the changes made to the standard MIB file 102 to be reflected in the output of a MIB compiler, the user has three options. According to the first option, the user may repeat the entire revision process described above. Specifically, the user can revise the updated standard MIB file 202 (block 204) to produce a revised compilation-specific MIB file 206. Then the revised compilation-specific MIB file 206 can be fed into MIB compiler 108 to produce an updated output 210.

According to the second option, the user can produce the revised compilation-specific MIB file 206 by revising the compilation-specific MIB file 106 (block 212) that was created during the original MIB compilation operation. The revisions made to the compilation-specific MIB file 106 must reflect the differences between the standard MIB file 102 and the updated standard MIB file 202. The revised compilation-specific MIB file 206 may then be fed into MIB compiler 108 to produce updated output 210.

According to the third option, a user may simply bypass the MIB compilation process and revise the original compiler output 110 to produce updated output 210 that reflects the differences between the standard MIB file 102 and the updated standard MIB file 202.

Each of these options requires a large amount of user time. Further, the revision process is performed manually, and is therefore subject to human error. Finally, the revision/recompilation process described above may have to be repeated separately for each of the outputs that were previously generated based on the original standard MIB file 102.

Based on the foregoing, it is clearly desirable to reduce the amount of revision that must be performed when a standard MIB file is updated. It is further desirable to decrease the complexity of using multiple MIB compilers by reducing the proliferation of non-standard, compilation-specific MIB files.

SUMMARY OF THE INVENTION

According to one aspect of the invention, a method for generating a plurality of output files based on a MIB specification is provided. According to the method, a first MIB compilation operation is performed by causing a first MIB compiler to read one or more files containing the MIB specification, causing the first MIB compiler to read a first plurality of directives from one or more directive files separate from the one or more files containing the MIB specification, and causing the first MIB compiler to generate a first output file based on the MIB specification and the first plurality of directives.

A second MIB compilation operation is performed by causing a second MIB compiler to read the one or more files containing the MIB specification, causing the second MIB compiler to read a second plurality of directives from one or more directive files separate from the one or more files containing the MIB specification, and causing the second MIB compiler to generate a second output file based on the MIB specification and the second plurality of directives.

The directives may include global (or control) directives, selection directives, augmentation directives and/or variation directives. Global directives are used to specify information global to the compiler process. Selection directives indicate the items within the MIB specification that are to be processed during the particular MIB compilation operation. Augmentation directives specify additional information to be associated with specified items in the MIB specification which is needed in the compilation operation, but that is not defined within the MIB specification. Variation directives indicate change of a value of a specified attribute on a specified item that is defined within the MIB specification. For example, the MIB specification may indicate that the value for the "access" attribute of an item is "read/write", and a variation directive may indicate that the item is to be processed as if the "access" attribute was defined to have the value "read-only".

According to another aspect of the invention, a MIB compiler is provided which performs a method for generating a single file that defines a selected plurality of MIB items. The MIB compiler performs the method by reading a MIB specification from a plurality of files. The MIB specification includes definitions for a plurality of MIB items. The MIB compiler then reads a plurality of directives from one or more directive files. The one or more directive files are separate from the plurality of files. The plurality of directives includes a set of selection directives. The set of selection directives indicate a subset of the plurality of MIB items. The MIB compiler creates the single file and stores in the single file definitions of all MIB items of the plurality of MIB items that are indicated by the set of selection directives.

According to another aspect of the invention, a MIB compiler is provided which performs a method for generating an item-specific directive file. The MIB compiler performs the method by reading a plurality of directives from one or more directive files. The plurality of directives includes one or more multiple-item directives. For example, the plurality of directives may include a directive which indicates a module to which multiple MIB items belong. The MIB compiler reads a MIB specification from one or more MIB files. Each of the one or more multiple-item directives indicates a plurality of items defined in the MIB specification. The MIB compiler creates the item-specific directive file and stores any item-specific directives included in the plurality of directives into the item-specific directive file. For each of the one or more multiple-item directives, the MIB compiler also generates a plurality of item-specific directives, each of which indicates one of the plurality of items in the MIB specification that are covered by the multiple-item directive, and stores the plurality of item-specific directives in the item-specific directive file.

According to another aspect of the invention, a multiple-MIB compiler system includes a single syntax checking unit which feeds a plurality of MIB compilers. Specifically, the syntax checking unit reads a MIB specification from one or more MIB files, determines whether the MIB specification conforms to a plurality of syntax rules, and generates processed MIB information containing data representing a plurality of modules defined in the MIB specification.

After the MIB specification has been checked by the syntax checking unit, a first MIB compiler reads the processed MIB information and generates a first output based on the processed MIB information. A second MIB compiler also reads the processed MIB information and generates a second output based on the processed MIB information.

According to yet another aspect of the invention, a system for generating a plurality of output files based on a MIB specification is provided. The system includes a MIB compiler, one or more files containing a first plurality of directives, and one or more files containing a second plurality of directives.

The first plurality of directives include a first set of directives that specify a first set of MIB items defined in the MIB specification. The second plurality of directives include a second set of directives that specify a second set of MIB items defined in the MIB specification. The MIB compiler reads the one or more files containing the first plurality of directives and generates a first output file based on the first set of MIB items. The MIB compiler reads the one or more files containing the second plurality of directives and generates a second output file based on the second set of MIB items.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
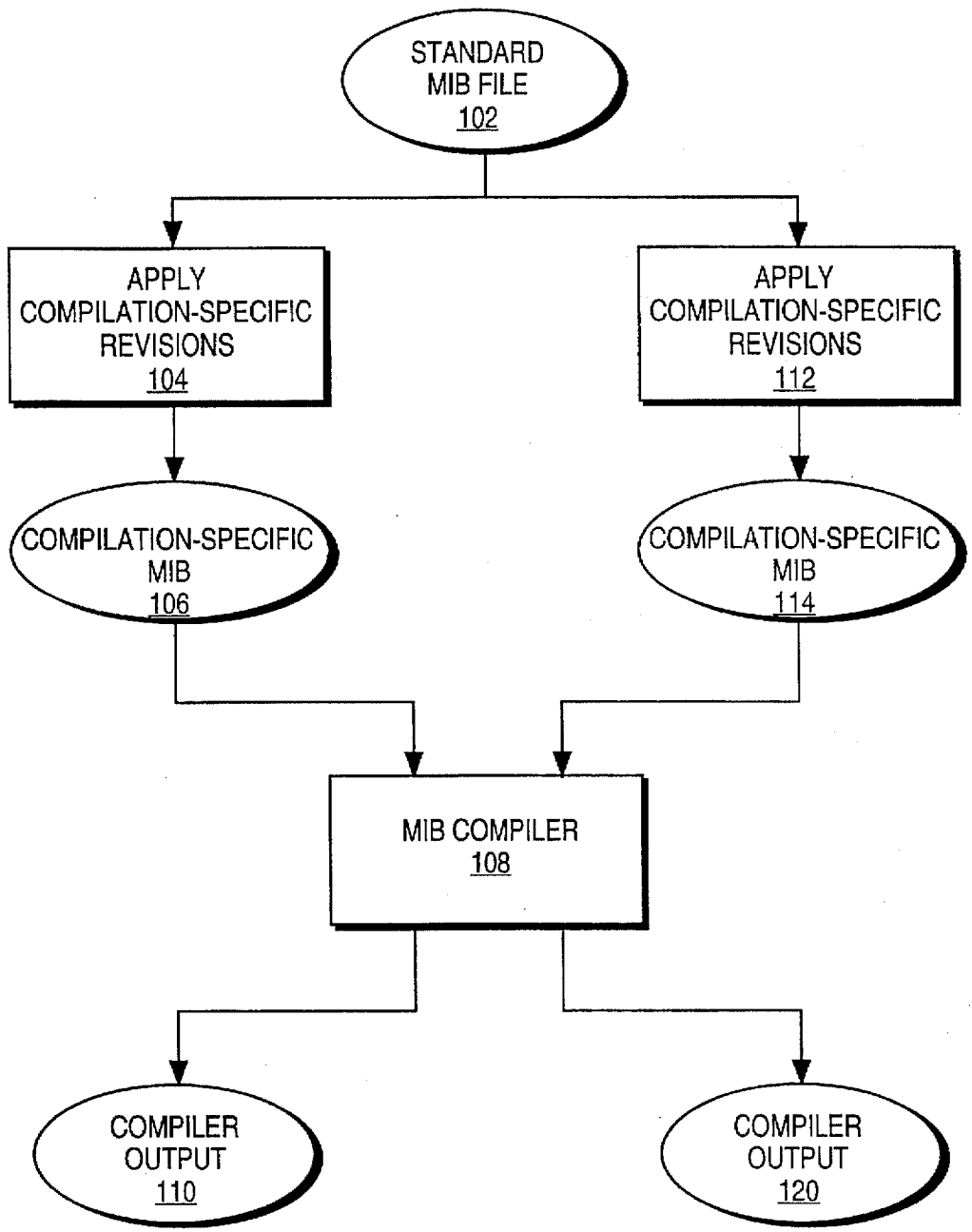
FIG. 1 is a data flow diagram illustrating the operation of a prior-art MIB compiler.
Figure 2:
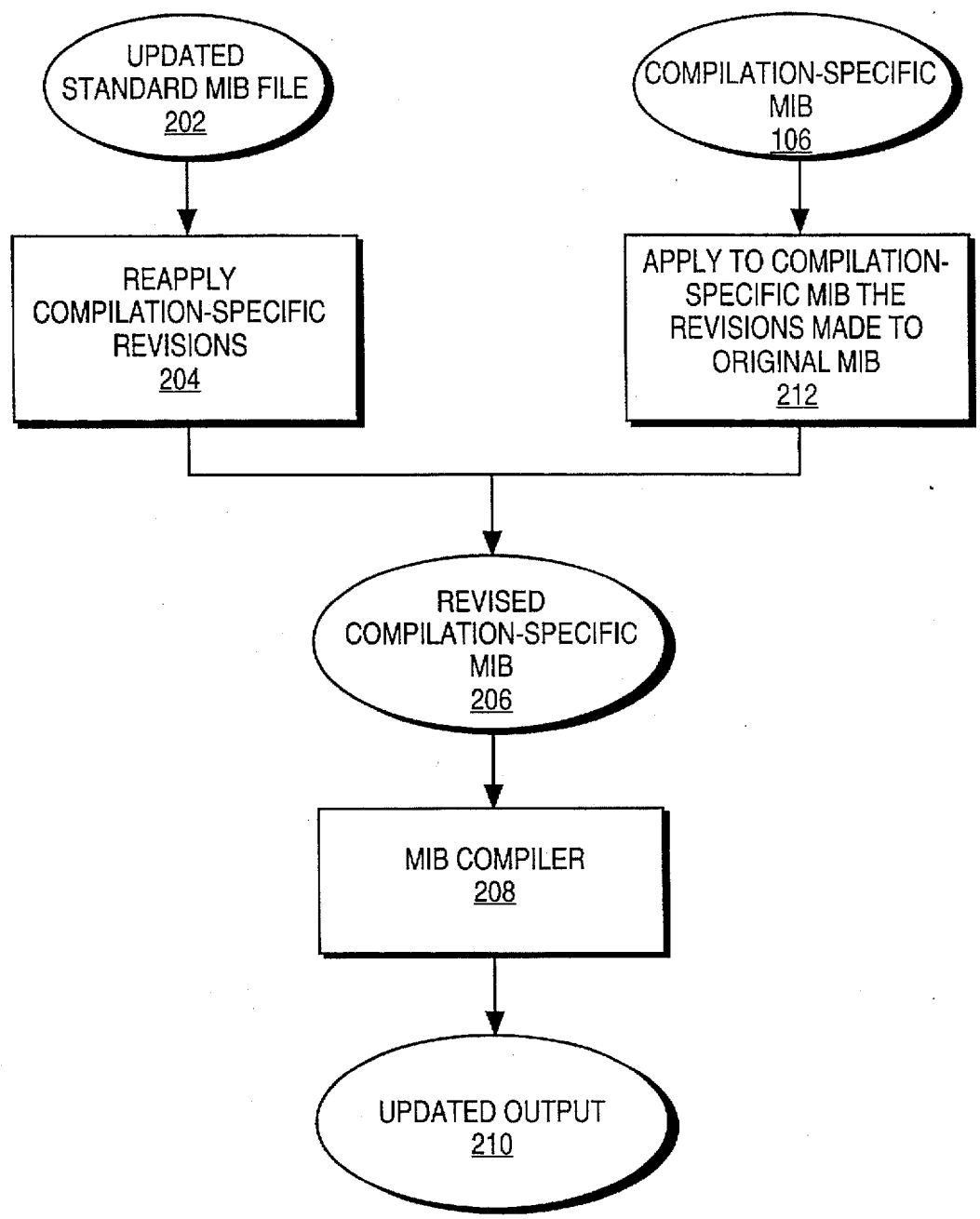
FIG. 2 is a data flow diagram illustrating the process required to update the output of a prior art MIB compiler when a standard MIB file is updated.
Figure 3:
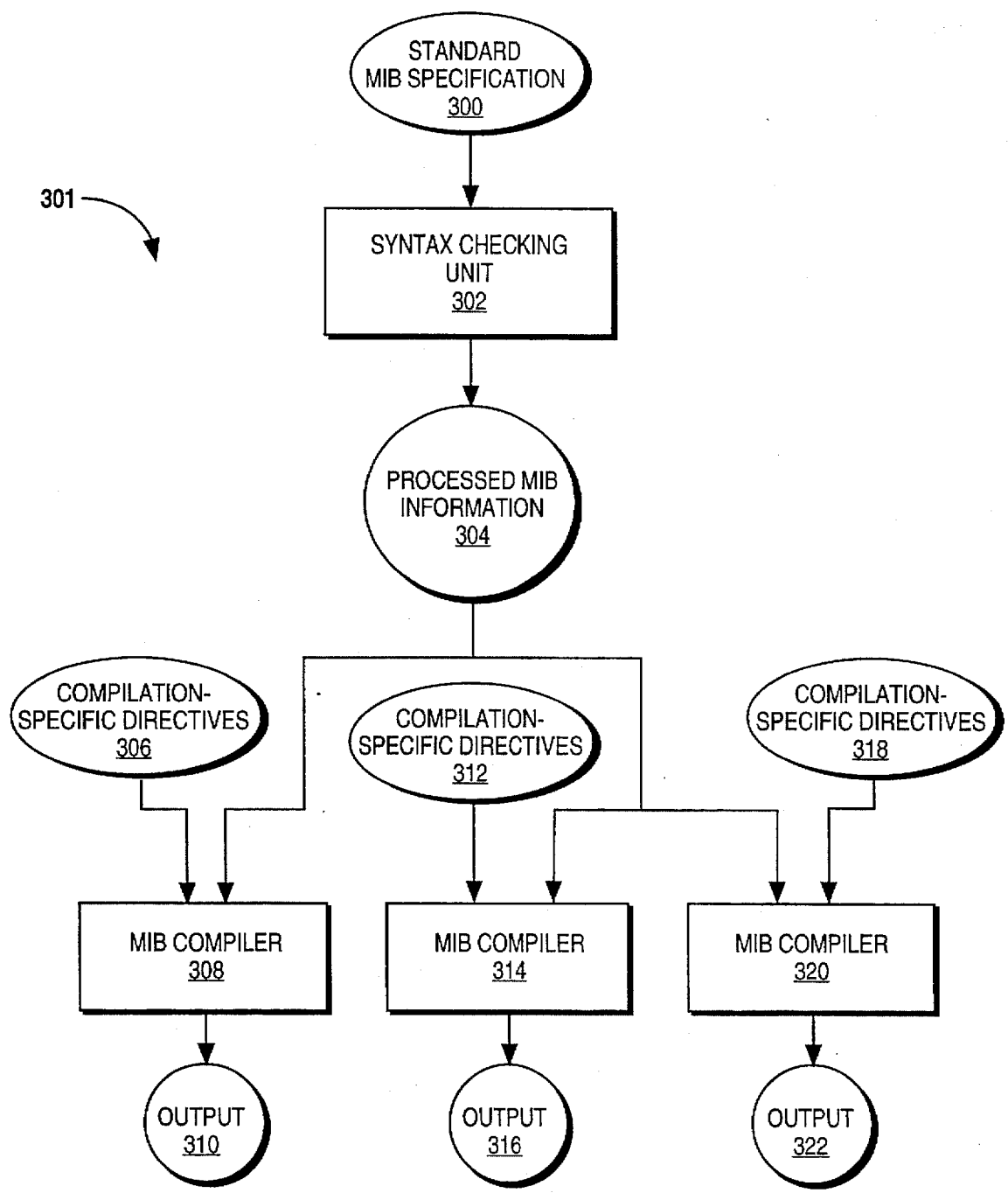
FIG. 3 illustrates a MIB compiler system in which MIB compilers generate output based on standard MIB specifications filtered and augmented responsive to compilation-specific directives.

Referring to FIG. 3, it is a data flow diagram illustrating a multiple-MIB compiler system 301 according to one embodiment of the present invention. System 301 generally includes a plurality of MIB compilers 308, 314 and 320 a separate syntax checking unit 302.

MIB compilers 308, 314 and 320 are configured to generate a plurality of outputs 310, 316 and 322 based on a standard MIB specification 300. Standard MIB specification 300 generally represents one or more files that specify MIB information in the standard MIB format. For the purposes of explanation, standard MIB specification 300 shall be described as if it were a single file.

SEPARATE SYNTAX CHECKING UNIT

Syntax checking unit 302 reads the standard MIB specification 300 and determines whether the contents of the standard MIB specification 300 conform to a set of syntax rules. In the preferred embodiment, the syntax rules against which syntax checking unit 302 checks standard MIB specification 300 are those rules established through the Internet Engineering Task Force (IETF). If the standard MIB specification 300 does not conform to the syntax rules, then syntax checking unit 302 generates an error indication. If the standard MIB specification 300 conforms to the syntax rules, then syntax checking unit 302 transmits processed MIB information 304 which contains the MIB information specified in the standard MIB specification 300.

For any given compilation operation, MIB compilers 308, 314 and 320 typically require some but not all of the MIB information contained in standard MIB specification 300. MIB compilers 308, 314 and 320 receive the MIB information they require from syntax checking unit 302 in the form of processed MIB information 304, rather than directly from standard MIB specification 300. Because syntax checking unit 302 performs a syntax check prior to generating processed MIB information 304, the MIB compilers 308, 314 and 320 do not have to perform their own syntax checking.

In an implemented embodiment of system 301, the processed MIB information 304 generated by syntax checking unit 302 is a tagged stream of characters. The stream of characters includes single-character symbols, representing a function or information field, followed by the arguments or information for the information field. While the presently-implemented embodiment of syntax checking unit 302 generates a tagged stream of characters, the format of the processed MIB information 304 may vary. The present invention is not limited to any specific format of processed MIB information 304.

The use of a separate syntax checking unit 302 provides significant benefits over the prior art, in which each MIB compiler has to perform its own syntax checking. For example, development of MIB compilers is simplified because the MIB compilers do not have to be programmed to perform their own syntax checking. Because they do not need to implement syntax checking, the MIB compilers themselves will typically be smaller, requiring less storage space. In addition, the use of a single, common syntax checking unit 302 eliminates the possibility of inconsistencies that may occur between the output and thoroughness of different compiler-implemented syntax checking routines.

DIRECTIVE-DRIVEN MIB COMPILERS

As mentioned above, different MIB compilation operations typically require different portions of the information contained in standard MIB files. For the following discussion, it shall be assumed that MIB compilers 308, 314 and 320 are performing compilation operations for different agents, and therefore require different portions of the information contained in the standard MIB specification 300.

The prior art MIB compilers required a user to either (1) modify the standard MIB files to ensure that the MIB compilers received only the MIB information they required, or (2) modify the output of MIB compilation operations based on the particular needs of an agent. Unlike the prior art, the MIB compilers 308, 314 and 320 of system 301 do not require modification of standard MIB specification 300 or of outputs 310, 316 and 322. Rather, each MIB compiler 308, 314 and 320 is designed to receive all of the processed MIB information 304. However, each MIB compiler 308, 314 and 320 selectively filters the processed MIB information 304 based on compilation-specific directives that are stored separate from the standard MIB specification 300.

Each of MIB compilers 308, 314 and 320 filters and/or augments the processed MIB information 304 based on a different set of compilation-specific directives. Specifically, MIB compiler 308 filters and augments the processed MIB information 304 based on a first set of compilation-specific directives 306 to generate output 310. MIB compiler 314 filters and augments the processed MIB information 304 based on a second set of compilation-specific directives 312 to generate output 316. MIB compiler 320 filters and augments the processed MIB information 304 based on a third set of compilation-specific directives 318 to generate output 322.

The compilation-specific directives for any given MIB compiler are stored in one or more files separate from the standard MIB specification 300. Because the compilation-specific directives are stored separate from the standard MIB specification 300, only one version of standard MIB specification 300 need exist at any given time. Further, the version of standard MIB specification 300 remains in the industry-standard MIB format, since the information required by a given MIB compiler that is not supported by the industry-standard format is supplied to the MIB compiler via the separately-maintained compilation-specific directives. The four general types of compilation-specific directives (global directives, selection directives, augmentation directives, and variation directives) are described below.

GLOBAL DIRECTIVES

Global directives are used to specify information global to the compiler process. Global directives may serve a function similar to that served in other applications by command line options. For example, a global directive may be used to specify values to control the operation of a MIB compiler, such as specifying the default values for augmentations.

SELECTION DIRECTIVES

Selection directives indicate which portions of the processed MIB information 304 are relevant for a particular MIB compilation operation. Selection directives include module selections, group selections and item selections.

Module selections identify modules within the standard MIB file that are to be processed by a MIB compiler. For example, standard MIB specification 300 may define twenty modules, but only five modules of the twenty may be supported by a particular agent. To indicate to the MIB compiler that only those five modules supported by the agent must be processed, the MIB compiler is fed module selections identifying the five modules. The MIB compiler will then filter out and ignore the remaining fifteen modules.

Group selections are used to indicate groups of items within a particular MIB module that are to be processed by the MIB compiler. Group selections are used when some but not all of the items within a module are to be processed. For example, a group selection may indicate that a particular object in a given module, and all items stemming from that particular object, are to be processed by the MIB compiler.

Item selections identify specific items within a particular module. Module, group and item selections provide three different levels of granularity to the MIB information selection process.

According to one embodiment of the invention, MIB compilers filter out and ignore all MIB information from the standard MIB specification that is not specified by selection directives. However, according to another embodiment, MIB compilers may be designed to process all MIB information that is not expressly excluded. Such an embodiment would include module, group and item excluders analogous to the module group and item selections described above. In yet another embodiment, MIB compilers may support both selection and excluder directives.

AUGMENTATION DIRECTIVES

Augmentation directives supply to MIB compilers information that is not present in the processed MIB information but which is required by the MIB compilers to perform particular MIB compilation operations. For example, object definitions can specify values for standard attributes such as syntax, access, and default value. However, a compiler for an agent may need the name of a function to call for each SNMP request (e.g. GET, SET, and GETNEXT). An augmentation directive is used to supply one or more attributes and associated values for specified items in modules. One implementation specifies only one attribute/value per specified item. Another implementation allows multiple attribute/ values to be specified per specified item.

VARIATION DIRECTIVES

Variation directives instruct MIB compilers to over-ride certain information contained in the standard MIB file. For example, a standard MIB file may specify that a particular item is read/write. However, a particular agent may only be capable of reading the item. Consequently, in a MIB operation performed for the particular agent, the MIB compiler is fed an item variation directive that specifies that the particular item is read-only. The item variation directive will over-ride the read/write indication contained in the processed MIB information 304, causing the MIB compiler to treat the particular item as if it were read-only.

DIRECTIVE FILES

In general, all MIB compilation operations performed for a given agent will require the same selection and variation directives, regardless of the MIB compiler performing the MIB compilation operation. The selection and variation directives required by a particular agent are referred to as the "profile" of the agent. A particular agent may also require certain augmentation directives, regardless of the MIB compiler performing the MIB compilation operation.

Similarly, a particular MIB compiler may require certain directives ("compiler-specific directives") regardless of the agent for which a compilation is to be performed. Compiler-specific directives are typically augmentation directives that define attributes and values needed by a particular MIB compiler. While such directives are referred to as "compiler-specific", it should be noted that one MIB compiler may require one or more of the same compiler-specific directives as another MIB compiler.

Assume that MIB compiler 308 generates output 310 for agent development, MIB compiler 314 generates output 316 for network management station application development, and MIB compiler 320 generates output 322 for testing. For MIB compiler 308 to generate agent development output 310 for a particular agent (Agent 1), compilation-specific directives 306 would include the profile of Agent 1 combined with the compiler-specific directives required by MIB compiler 308. For MIB compiler 314 to generate network management station output 310 for Agent 1, compilation-specific directives 312 would include the profile of Agent 1 combined with the compiler-specific directives required by MIB compiler 314. For MIB compiler 320 to generate output 322 for testing Agent 1, compilation-specific directives 318 would include the profile of Agent 1 combined with the compiler-specific directives required by MIB compiler 320.

The directives for any given MIB compilation operation may be stored in a single file or divided up into separate files. However, as explained above, the selection and variation directives used in MIB compilation operations generally vary from agent to agent while the augmentation directives used in a MIB compilation generally vary from compiler to compiler. Therefore, in the preferred embodiment, the selection and variation directives associated with a given agent are maintained in a single directive file, while the augmentation directives are maintained in a separate directive file. The augmentation directives may also be separated into two files, one of which contains augmentation directives that are specific to a compiler, an the other which contains the augmentation directives that may be shared by many compilers. Files containing augmentation directives may easily be fed into many compilers, making it easy for multiple MIB compilers to share the same augmentation information.

RESPONDING TO UPDATES TO STANDARD MIB FILES

By maintaining standard MIB files separate from the directives required by compilation operations, numerous benefits are obtained. For example, when a standard MIB file is updated, it is desirable to regenerate, based on the updated MIB file, the outputs that were originally generated based on the standard MIB file. As explained above, this involved a tedious revision process for the users of prior art MIB compilers. In contrast, little or no revisions are required for the MIB compilers of system 301 to regenerate the outputs to reflect the updated MIB file.

Specifically, syntax checking unit 302 generates processed MIB information 304 based on the updated standard MIB file. Each of MIB compilers 308, 314 and 320 filters and augments the processed MIB information 304 based on same compilation-specific directives 306, 312 and 318 used during the original compilation operations. The outputs 310, 316 and 322 thus produced will reflect the updated standard MIB, but only those sections of the updated standard MIB file that were relevant in the original MIB compilation operations.

SPECIFIC DIRECTIVE-DRIVEN MIB COMPILERS

In general, the one or more files containing the selection directives used in a particular MIB compilation operation serve to document which MIB items were processed and which MIB items were excluded in the particular MIB compilation operation. However, selection directives may include directives that affect more than one item (e.g. directives for designating entire modules and directives for designating groups of items), as well as single-item selection directives. Multiple-item selection directives do not clearly document the MIB items that were processed in a MIB compilation operation, since items may be added to an updated version of a standard MIB module used in the MIB compilation operation after the MIB compilation operation.

For example, the selection directives used in a particular MIB compilation operation may include the directive "include Module X". At the time the MIB compilation operation is performed, Module X may include Items 1, 2 and 3. After the MIB compilation operation is performed, an Item 4 may be added to Module X in the standard MIB file. By inspecting the file containing the selection directives, one would not be able to tell that Item 4 was not processed during the MIB compilation operation.

To overcome this problem, one could store an image of the standard MIB file as it existed at the time the MIB compilation operation was performed. However, this results in a proliferation of MIB files, which is one of the problems that the present invention seeks to avoid.

Alternatively, one could eliminate support for multiple-item selection directives. Thus, every item that is processed in the MIB compilation operation would be expressly designated by a selection directive. However, this approach would render the process of designating directives cumbersome. A module may include hundreds of items. It is much more efficient to designate the hundreds of items by specifying the module rather than each of the hundreds of items.

To address the problems recited above, one of the MIB compilers provided in system 301 is a directive file expander. A directive file expander is a MIB compiler that reads a directive file that includes multiple-item selection directives and generates an equivalent file that contains only single-item selection directives. The directive file expander determines which items are covered by a particular multiple-item selection directive by reading the processed MIB information 304. The resulting selection directive file may then be used as input for another MIB compiler in a later MIB compilation operation. The single-item selection directives of the selection directive file serve to accurately document the items that were considered in the later MIB compilation operation, regardless of modifications that may be performed on standard MIB specification 300 after the later MIB compilation operation.

In an alternative embodiment, the output of the directive file expander is a list of the items defined in the standard MIB specification 300 that are covered by the selection directives in the input selection directive file, rather than a list of single-item selection directives. The list of items may be stored along with the output generated during a MIB compilation operation to document the specific items that were considered in generating the output.

As explained above, standard MIB specification 300 may in fact consist of multiple files, each containing one or more modules. Such is the case, for example, when one file containing a MIB module depends on and uses MIB information contained in a different MIB module. However, certain MIB compilers expect all of the MIB information that they require to be stored in a single MIB module contained in a single file.

One can use a text editor to manually merge information from many related MIB files into a single MIB file. However, the process of manually merging MIB files is time consuming and error prone. Therefore, the preferred embodiment of system 301 includes a MIB file merger. The MIB file merger is a MIB compiler that generates as its output a single MIB file that defines a single MIB module containing the items from processed MIB information 304. The resulting module may contain a subset of items from the processed MIB information 304 based on the selection directives fed to the MIB file merger.

System 301 may also include MIB compilers for generating source code for agent and/or network management applications. In addition, system 301 may include MIB compilers for generating input files for network management tools, such as agent testers and network topology display programs. System 301 may additionally include MIB compilers for generating documentation that describes the MIB support provided by a given agent.

Regardless of the specific output generated by MIB compilers, significant benefits are derived from the fact that the each MIB compiler is designed to receive compilation-specific information from a separate source than the standard MIB specification. For example, separate versions of the standard MIB specification do not have to be prepared for each compiler, and for each compilation operation. Rather, separate files containing directives to select and augment the standard MIB files are stored and maintained separate from the files containing the standard MIB specifications. One or more directive files may be created for each agent. Multiple MIB compilers may all access the directive files that correspond to a particular agent to generate output for that agent. In addition, the content of directive files serve to document the MIB modules and items that were considered and/or excluded during any given MIB compilation operation.

In the preferred embodiment, the MIB compilers described herein are software modules stored on a digital data storage medium. The MIB compilers include instructions that, when executed by a processor, perform the described operations. It should be noted, however, that the MIB compilers may alternatively be implemented partially or completely in hardware. The present invention is not limited to any specific type of MIB compiler implementation.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for generating a plurality of output files based on a MIB specification, the method including the steps of:
   performing a first MIB compilation operation by causing a first MIB compiler to read one or more files containing the MIB specification;
   causing the first MIB compiler to read a first plurality of directives from one or more directive files separate from the one or more files containing the MIB specification, the first plurality of directives specifying modifications to the MIB specification;
   causing the first MIB compiler to generate a first output file based on the MIB specification as modified as specified by said first plurality of directives;
   performing a second MIB compilation operation by causing a second MIB compiler to read the one or more files containing the MIB specification;
   causing the second MIB compiler to read a second plurality of directives from one or more directive files separate from the one or more files containing the MIB specification, the second plurality of directives specifying modifications to the MIB specification; and
   causing the second MIB compiler to generate a second output file based on the MIB specification as modified as specified by said second plurality of directives.

2. The method of claim 1 wherein:
   the first plurality of directives include a first set of directives that indicate portions of the MIB specification that are required for said first MIB compilation operation; and
   the step of causing the first MIB compiler to generate the first output file includes causing the first MIB compiler to generate the first output file based on the portions of the MIB specification indicated by the first set of directives.

3. The method of claim 2 wherein:
   the second plurality of directives include a second set of directives that indicate portions of the MIB specification that are required for said second MIB compilation operation; and
   the step of causing the second MIB compiler to generate the second output file includes causing the second MIB compiler to generate the second output file based on the portions of the MIB specification indicated by the second set of directives.

4. The method of claim 1 wherein:
   the first plurality of directives include a first set of directives that represent information not contained in the MIB specification that is required to perform said first MIB compilation operation; and
   the step of causing the first MIB compiler to generate the first output file includes causing the first MIB compiler to generate the first output file based on the MIB specification and information represented by the first set of directives.

5. The method of claim 1 further including the steps of:
   prior to the step of causing the first MIB compiler to generate the first output file, performing the steps of
      causing a syntax checking unit to read the one or more files containing the MIB specification,
      causing the syntax checking unit to determine whether the one or more files containing the MIB specification conforms to a plurality of syntax rules, and
   prior to the step of causing the second MIB compiler to generate said second output file, performing the steps of
      causing the syntax checking unit to read the one or more files containing the MIB specification, and
      causing the syntax checking unit to determine whether the one or more files containing the MIB specification conforms to said plurality of syntax rules.

6. The method of claim 1 wherein the first plurality of directives are the same as the second plurality of directives.

7. The method of claim 6 wherein the first plurality of directives and the second plurality of directives indicate a plurality of MIB items supported by a particular agent.

8. The method of claim 7 wherein at least one of said plurality of MIB items is defined in said MIB specification, and at least another of said plurality of MIB items is not defined in said MIB specification.

9. The method of claim 1 wherein the first plurality of directives contains information required by said first MIB compiler but not required by said second MIB compiler.

10. A method for generating a single file, defining a selected plurality of MIB items, which is associated with an agent, the method comprising the steps of:
   reading a MIB specification from a plurality of files, wherein the MIB specification includes definitions for a plurality of MIB items;
   reading a plurality of directives from one or more directive files, wherein said one or more directive files are separate from said plurality of files, wherein said plurality of directives includes a set of selection directives specific to said agent, and wherein said set of selection directives indicate a subset of said plurality of MIB items; and compiling said single file, concurrently utilizing the MIB specification and the plurality of directives, to include definitions of all MIB items of said plurality of MIB items that are indicated by said set of selection directives.

11. The method of claim 10 wherein said plurality of directives includes a set of augmentation directives specific to said agent, wherein said set of augmentation directives add new attributes and values to MIB items defined in said MIB specification, and wherein the method further includes the step of storing definitions of said set of MIB items in said single file.

12. A method for generating a single-item selection directive file, the method comprising the steps of:

reading a plurality of directives from one or more directive files, wherein the plurality of directives includes one or more multiple-item selection directives;

reading a MIB specification from one or more MIB files, wherein each of said one or more multiple-item selection directives indicates a plurality of items defined in said MIB specification;

creating said single-item selection directive file;

storing any single-item selection directives included in said plurality of directives into said single-item selection directive file; and for each of said one or more multiple-item selection directives generating a plurality of single-item selection directives, each of which indicates one of the plurality of items in said MIB specification that are covered by said multiple-item selection directive; and storing said plurality of single-item selection directives in said single-item selection directive file.

13. The method of claim 12 wherein said plurality of directives includes a directive indicating a module in said MIB specification, wherein said step of generating said plurality of single-item selection directives includes generating an single-item selection directive for each item defined in said module.

14. A method for use in a multiple-MIB compiler system, the method comprising the steps of:

causing a syntax checking unit to
read a MIB specification from one or more MIB files;
determine whether the MIB specification conforms to a plurality of syntax rules;
generate processed MIB information containing data representing a plurality of modules defined in said MIB specification;

causing a first MIB compiler to
read the processed MIB information;
generate a first output based on said processed MIB information; causing a second MIB compiler to read the processed MIB information;
generate a second output based on said processed MIB information;

wherein said first MIB compiler and said second MIB compiler are different MIB compilers.

15. The method of claim 14 wherein said syntax checking unit is separate from both said first MIB compiler and said second MIB compiler.

16. The method of claim 14 further comprising the steps of:

causing the first MIB compiler to read a first plurality of directives from one or more directive files; and causing the second MIB compiler to read a second plurality of directives from one or more directive files;

wherein said first MIB compiler generates said first output based on said first plurality of directives and said second MIB compiler generates said second output based on said second plurality of directives.

17. The method of claim 16 wherein:

said first plurality of directives include a first set of directives that indicate portions of said processed MIB information to be processed by said first MIB compiler;

said first MIB compiler generates said first output responsive to said portions of said processed MIB information indicated by said first set of directives;

said second plurality of directives include a second set of directives that indicate portions of said processed MIB information to be processed by said second MIB compiler;

said second MIB compiler generates said second output responsive to said portions of said processed MIB information indicated by said second set of directives.

18. A system for generating a plurality of output files based on a MIB specification, the system comprising:

a MIB compiler; and one or more files containing a first plurality of directives, said first plurality of directives including a first set of directives that specify a first set of MIB items defined in said MIB specification;

one or more files containing a second plurality of directives, said second plurality of directives including a second set of directives that specify a second set of MIB items defined in said MIB specification;

wherein said MIB compiler reads said MIB specification and said one or more files containing said first plurality of directives and generates a first output file based on said first set of MIB items;

wherein said MIB compiler reads said one or more files containing said second plurality of directives and said MIB specification and generates a second output file based on said second set of MIB items.

19. The system of claim 18 wherein:

said first plurality of directives includes a third set of directives indicating new attributes and values to MIB items defined in said MIB specification; and said MIB compiler generates said first output file based on said first set of MIB items and said third set of MIB items.

20. The system of claim 18 wherein:

said MIB specification defines a MIB item in said first set of MIB items as having a first attribute value;

said first plurality of directives includes a directive indicating a different attribute value for said MIB item; and said MIB compiler generates said first output file based on said MIB item having said different attribute value.

* * * * *